(12) United States Patent  
Shikii et al.

(10) Patent No.: US 7,394,085 B2  
(45) Date of Patent: Jul. 1, 2008

(54) IMAGE FORMATION APPARATUS

(75) Inventors: Shinichi Shikii, Kanagawa (JP); Yasunori Ohta, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 69 days.

(21) Appl. No.: 11/405,474

(22) Filed: Apr. 18, 2006

(65) Prior Publication Data

US 2006/0249700 A1    Nov. 9, 2006

(30) Foreign Application Priority Data

Apr. 18, 2005    (JP)    ............ P. 2005-119623

(51) Int. Cl.
*A61B 6/00*    (2006.01)
(52) U.S. Cl. .................... 250/583; 250/484.3
(58) Field of Classification Search .......... 250/583, 250/484.3
See application file for complete search history.

(56) References Cited

U.S. PATENT DOCUMENTS 7,155,048 B2 * 12/2006 Ohara ................ 382/132

FOREIGN PATENT DOCUMENTS

JP    2004-138786 A    5/2004

* cited by examiner

*Primary Examiner*—David P. Porta
*Assistant Examiner*—Marcus H Taningco
(74) *Attorney, Agent, or Firm*—Sughrue Mion, PLLC

(57) ABSTRACT

An image formation apparatus comprising: an image exposure portion that forms a latent image by optically exposing a recording medium based on entered image data; a thermal development portion that visualizes the latent image by heating the recording medium exposed by the image exposure portion; a data identification portion that reads ID information about image data obtained by mammography; and a data-processing portion that: when the data identification portion has determined that a set of breast image data about the same patient have been entered successively, rotates through 180° (i) images represented by even-numbered input ones of the set of breast image data or (ii) images represented by odd-numbered input ones of the set of breast image data; and then outputs the image data to the image exposure portion.

6 Claims, 10 Drawing Sheets

IMAGE FORMATION APPARATUS

BACKGROUND OF THE INVENTION

1. Field of the Invention

The present invention relates to an image formation apparatus and, more particularly, to an image formation apparatus for forming breast images on a recording medium based on breast image data acquired by mammography.

2. Description of the Related Art

In an examination of breast cancers, mammographic images of left and right breasts which are acquired mammographically and formed on a thermally developed photosensitive material are arrayed side by side and compared for diagnosis. Such a mammographic image is obtained by producing breast image data by a mammography imaging unit, sending the data to an image formation apparatus, and optically exposing and thermally developing the image to visualize it. In the mammography imaging unit, image data are generally treated as follows to facilitate doctor's diagnosis. One of the left and right breast images is rotated through 180° such that the left and right breast images are placed in a back to back relation about the chest walls. Then, the image data are output.

A known image output processing apparatus for forming such mammographic images consists of forming breast images on a thermally developed photosensitive material, placing the images such that they do not touch the front or rear end of the photosensitive material in the direction of transportation or placing the images of the left and right breasts in a back to back relation about the chest wall portions, and outputting the images with optimum layout (see, for example, JP-A-2004-138786).

With this image output processing apparatus, when a thermally developed photosensitive material is brought into contact with the heat application portion of the thermal development portion and developed, images of breasts are so placed that they are not formed at the front end or rear end of the thermally developed photosensitive material in the direction of transportation; otherwise, the transfer of heat from the heat application portion would become unstable, tending to cause a decrease of the concentration of the mammographic images or nonuniformity of the concentration. In this way, the effects of the concentration nonuniformity on the diagnosis are suppressed.

As described previously, the image output processing apparatus of JP-A-2004-138786 suppresses decrease and nonuniformity of the concentration of mammographic images in the direction of transportation of the thermally developed photosensitive material. However, decrease and nonuniformity of the concentration also take place in the widthwise direction perpendicular to the direction of transportation of the thermally developed photosensitive material.

In particular, each mammographic image formed on the thermally developed photosensitive material is visualized by bringing the photosensitive material into contact with the heating portion of the thermal development portion. The photosensitive material has been optically exposed by the image exposure portion and a latent image has been formed on the photosensitive material. Thus, a visible image is formed. Considerations are given to the temperature distribution of the heating portion such that the thermally developed photosensitive material is uniform in temperature in order to heat every portion of the photosensitive material with uniform temperature. However, as shown in FIG. 10A, a larger amount of heat is dissipated from each end of the heating portion than from the center. The temperature at each end tends to drop.

When a thermally developed photosensitive material is brought into contact with the heating portion having a temperature distribution in the widthwise direction as described above and development is done, there is the danger that the concentration becomes nonuniform across the width of the thermally developed photosensitive material. That is, as shown in FIGS. 10B and 10C, where the images to be developed are mammographic images, if an image A of the right breast and an image 8 of the left breast are output separately, then a mammographic image 11 to be developed which is obtained from the image A by making contact with the center of the heating portion (i.e., the heating portion of uniform temperature) is developed with desired temperature. As a result, normal concentration is obtained. On the other hand, a mammographic image 13 which is to be developed and is obtained from the image B by making contact with ends of the heating portion that tend to drop in temperature is developed with lower temperature. Consequently, there is the possibility that normal concentration is not obtained.

More particularly, each point, for example, on a line a constituting the breast image A of the mammographic image 11 is brought into contact with the heating portion of given temperature $T_B$ and developed. Meanwhile, each point on a line b on the breast image B that is in a position corresponding to the line a of the breast image A is brought into contact with the heating portion of lower temperature $T_b$ and developed. Accordingly, there is the danger that comparison of corresponding portions of the breast images A and B (e.g. points $P_R$ and $P_L$) in terms of concentration and hue reveals that these portions are different in concentration and hue. Since alphanumeric information is formed in ancillary relationship to the mammographic images 11 and 13, the up-down direction of the mammographic images 11 and 13 can be discerned during outputting. In this example, for the sake of convenience, arrows are attached to the mammographic images 11 and 13, and the direction indicated by the arrows is defined as the upward direction in the figure.

The mammographic images 11 and 13 obtained in this way are arranged such that the chest wall portions $A_K$ and $B_K$ of the breast images A and B are placed in a back to back relation as shown in FIG. 11. Then, the images are placed on a showcase. The doctor observes the images A and B of the left and right breasts (mammographic images 11 and 13), discerns subtle differences in geometry and concentration between both breasts, and makes a diagnosis. However, as described previously, the corresponding portions of the breast images A and B are brought into contact with heating portions of different temperatures and developed. Consequently, they may differ in concentration and hue. There is the possibility that it is less easy for the doctor to make a diagnosis.

Accordingly, there is a demand for further improvement to prevent nonuniformity of concentration and hue in the widthwise direction of a thermally developed photosensitive material, in addition to the direction of transportation, in order to obtain mammographic images of good quality (i.e., uniform in concentration and hue over the whole surface of each mammographic image).

SUMMARY OF THE INVENTION

The present invention has been made in view of the foregoing circumstances. It is an object of the invention to provide an image formation apparatus capable of forming good-quality mammographic images which are prevented from becoming nonuniform in concentration and hue by developing images of the left and right breasts of the same patient under the same temperature conditions.

The above-described object of the present invention can be achieved by the configurations described below.

(1) An image formation apparatus comprising: an image exposure portion that forms a latent image by optically exposing a recording medium based on entered image data; a thermal development portion that visualizes the latent image by heating the recording medium exposed by the image exposure portion; a data identification portion that reads ID information about image data obtained by mammography; and a data-processing portion that: when the data identification portion has determined that a set of breast image data about the same patient have been entered successively, rotates through 180° (i) images represented by even-numbered input ones of the set of breast image data or (ii) images represented by odd-numbered input ones of the set of breast image data; and then outputs the image data to the image exposure portion.

In the image formation apparatus constructed in this way, with respect to successive breast image data about the same patient, an image represented by each even- or odd-numbered input data set of the breast image data through 180°, and mammographic images are formed. Therefore, when images of the left and right breasts are formed on a recording medium, portions of the images of the left and right breasts which correspond to each other are brought into contact with the same part of the heating portion and developed. Accordingly, it is assured that the portions of the images of the left and right breasts which correspond to each other are developed under the same temperature conditions. This prevents the corresponding parts of the images of the left and right breasts from becoming nonuniform in concentration and hue in spite of widthwise temperature distribution of the heating portion. In consequence, good-quality mammographic images adapted for comparative diagnosis are obtained.

(2) An image formation apparatus as set forth in (1) above, wherein the data-processing portion processes the set of breast image data about the same patient, the set of breast image data comprising successively-input image data about left and right breast images, so as to rotate any one of the successively-input image data such that each of chest wall portions under the left and right breast images to be formed on the recording medium based on the breast image data extends along an end portion of the recording medium that are parallel to a direction of transportation of the recording medium and that the left and right breast images are oriented in the same direction.

In the image formation apparatus constructed in this way, the chest wall portions of the left and right breast images of the same patient are formed so as to extend along end portions of the recording medium that are parallel to the direction of transportation of the medium and that the left and right breast images are oriented in the same direction. Consequently, the corresponding parts of the left and right breast images can be developed under the same temperature conditions. Accordingly, mammographic images which are not different in concentration and hue between the left and right breasts are obtained.

BRIEF DESCRIPTION OF THE DRAWINGS

FIGS. 5A-5C illustrate the relation between the temperature distribution across a heating portion and the thermal development position on a recording medium, wherein FIG. 5A shows the temperature of the heating portion plotted against the widthwise position on an image, FIG. 5B shows a mammographic image including one breast image A of left and right breast images, and FIG. 5C shows a mammographic image including the other breast image B;

FIGS. 7A-7C illustrate the relation between the temperature distribution across a heating portion and the thermal development position on a recording medium, wherein FIG. 7A shows the temperature of the heating portion plotted against the widthwise position on an image, FIG. 7B shows a mammographic image including one breast image A of left and right breast images, and FIG. 7C shows a mammographic image including the other breast image B;

DETAILED DESCRIPTION OF THE INVENTION

Figure 1:
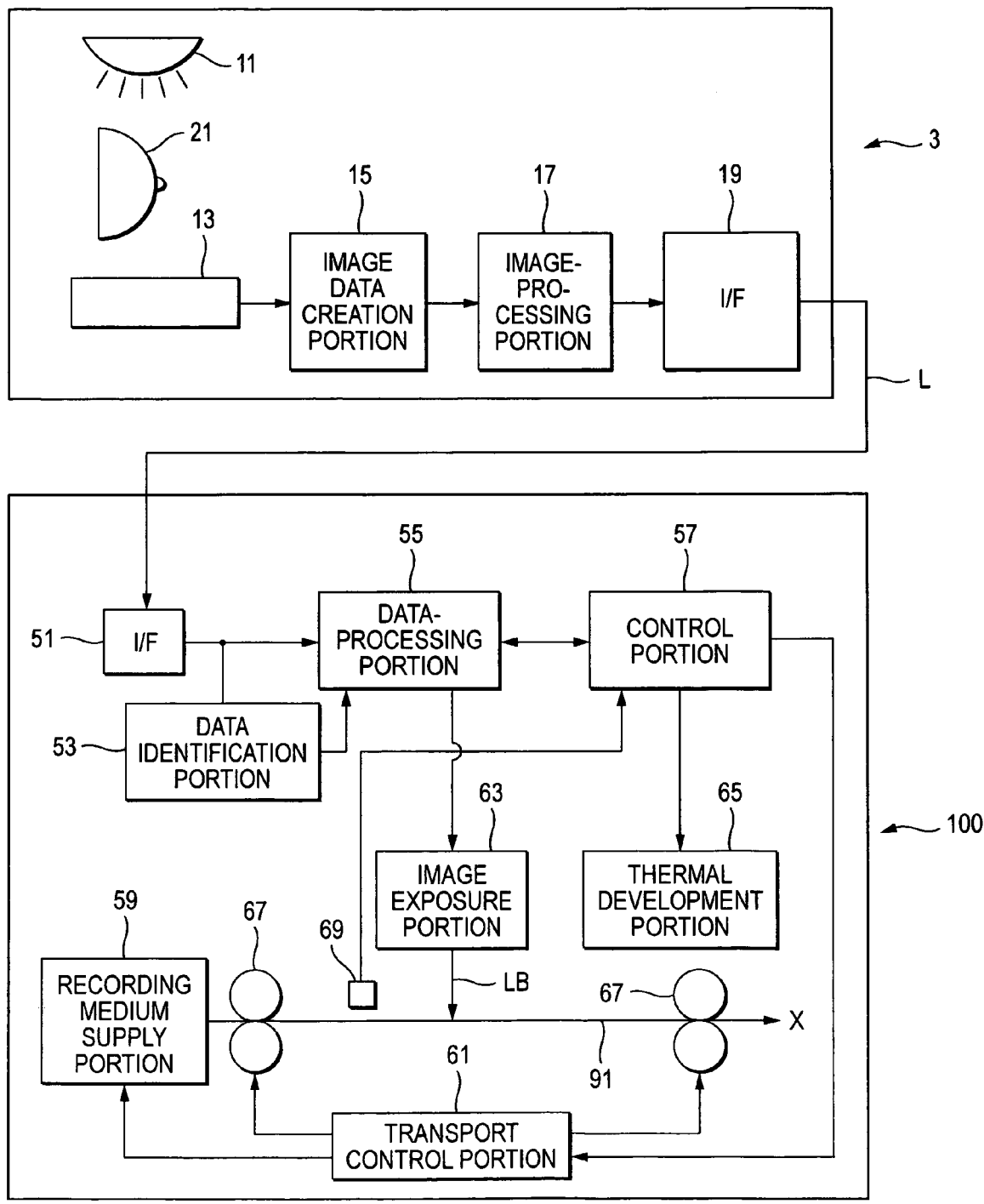
FIG. 1 is a block diagram of a mammography imaging unit and an image formation apparatus.
Figure 2:
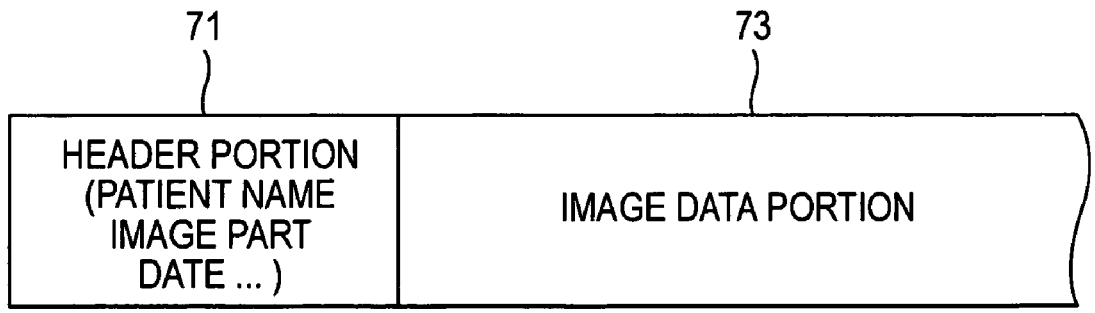
FIG. 2 is a diagram illustrating the structure of data.
Figure 3:
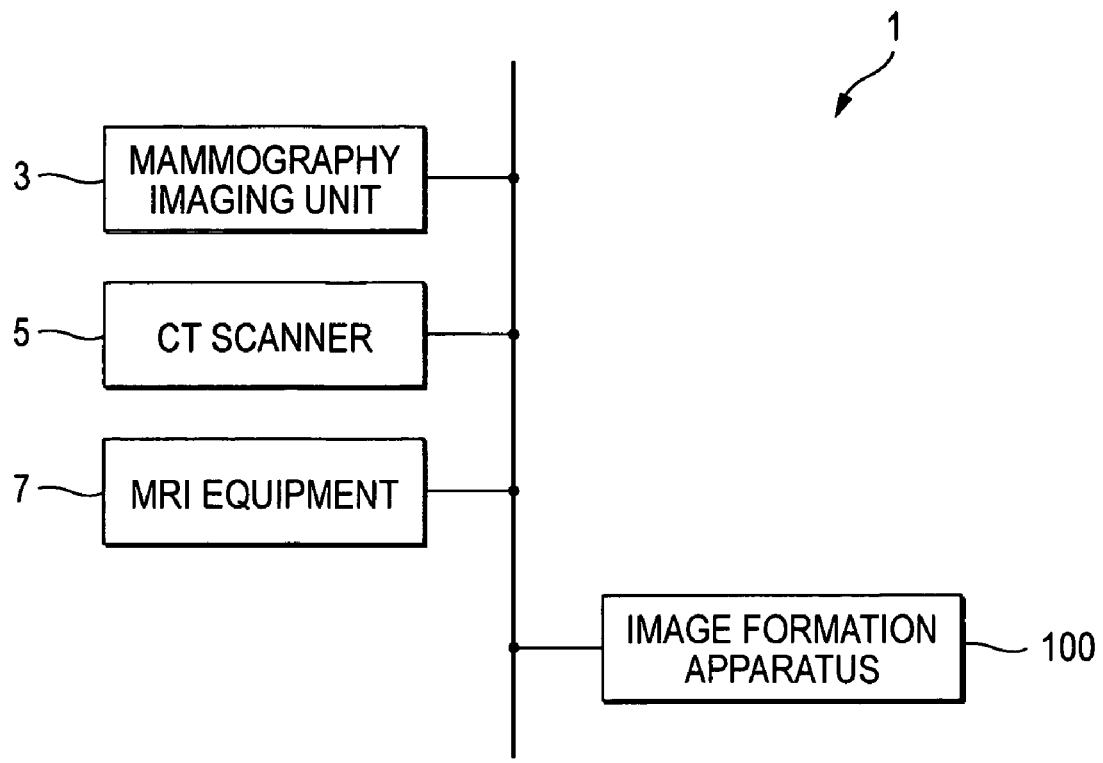
FIG. 3 is a diagram of an imaging diagnostic system designed including an image formation apparatus.

Preferred embodiments of an image formation apparatus associated with the present invention are hereinafter described in detail with reference to the drawings. FIG. 1 is a block diagram of a mammography imaging unit and an image formation apparatus. FIG. 2 is a diagram illustrating the structure of data obtained by the mammography imaging unit. FIG. 3 is a system diagram of imaging diagnostic equipment designed including the image formation apparatus.

As shown in FIG. 1, an image formation apparatus 100 of the present invention is connected with a mammography imaging unit 3 by a communication line L.

The structure of the mammography imaging unit 3 is first described. As shown in FIG. 1, the imaging unit 3 has an X-ray source 11, an X-ray capture section 12 consisting of a stimulable phosphor sheet, flat panel detector, or the like, an image data creation portion 15 for converting the image obtained from the X-ray capture section 12 into data about a breast image, an image-processing portion 17 for adding a header portion including ID information to the created breast image data or performing image processing, for example, for rotation, and a communication interface (IF) 19 that outputs the breast image data.

The structure of the data created by the mammography imaging unit 3 that includes other type of imaging unit such as MRI equipment is stipulated by the DICOM standard. As shown in FIG. 2, the data structure consists of a header portion 71 and an image data portion 73 recorded subsequently to the header portion 71. The ID information is recorded in the header portion 71. Image data (here, breast image data) is recorded in the image data portion 73. Various kinds of information (such as patient name, imaged parts, date of imaging, and imaging equipment name) ancillary to the image data are recorded as the ID information.

In the following description, the ID information in the header portion 71 and the image data in the image data portion 73 are collectively referred to simply as the acquired image data.

Figure 11:
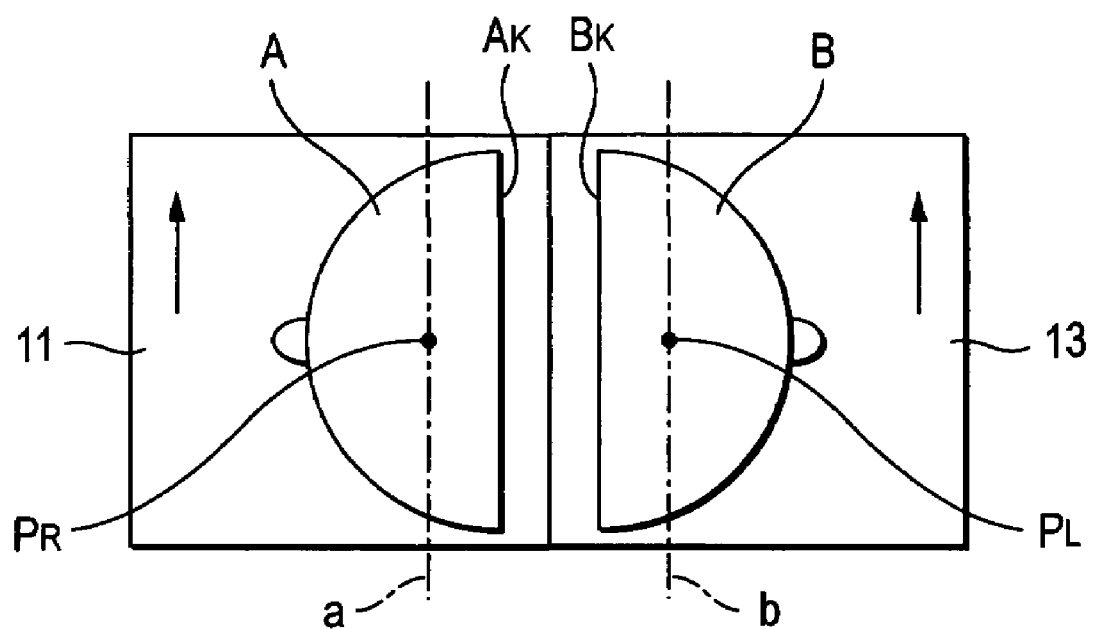
FIG. 11 shows the state in which the related-art mammographic images are arranged such that the chest wall portions are placed in a back to back relation and then the images are placed on a showcase.

As shown in FIG. 11 the mammography imaging unit 3 directs X-rays at the breasts 21 of an examinee from the X-ray source 11. The transmitted radiation is captured by the X-ray capture section 12. The captured radiation is converted into breast image data by the image data creation portion 15. The image data is further subjected to given image processing by the image-processing portion 17. The obtained image data is sent to the image formation apparatus 100 from the communication interface 19 via the communication line L.

The thermally developed recording apparatus 100 that is one example of the image formation apparatus are next described. The thermally developed recording apparatus 100 performs scan and exposure while modulating the output light from the image exposure portion based on the input image data. In this way, a latent image is formed on the thermally developed recording material. Then, the latent image is visualized by heating the material in the thermal development portion. Image data acquired by the mammography imaging unit 3 is sent to the thermally developed recording apparatus 100 via the communication line L.

As shown in FIG. 1, the thermally developed recording apparatus 100 forms a latent image by exposing the thermally developed recording material to a light beam consisting of laser light, using the thermally developed recording material consisting of a thermally developed photosensitive material or photosensitive and heat-sensitive recording material that is a recording medium which does not need moist development. Then, the thermally developed recording material is heated by the thermal development portion to visualize the latent image. Then, the image is cooled down to room temperature.

The thermally developed recording apparatus 100 has a communication interface (IF) 51, a data identification portion 53, a data-processing portion 55, a control portion 57 for controlling various mechanisms according to a given procedure, a thermally developed recording material supply portion 59 for taking out film sheets of a thermally developed recording material 91 one by one from a cassette (not shown) or paying out a film sheet in the form of a roll to a transport section 67, a transport control portion 61 for controlling the operation of the transport section 67, an image exposure portion 63 for scanning the laser beam LB based on the acquired image data in the main scan direction for exposure and forming a latent image on the thermally developed recording material 91 that is conveyed in an auxiliary scan direction (i.e., in the transport direction) substantially perpendicular to the main scan direction, and a thermal development portion 65 for elevating the temperature while transporting the thermally developed recording material 91 to visualize the latent image.

The aforementioned thermally developed photosensitive material or photosensitive and heat-sensitive recording material can be used as the thermally developed recording material 91. The thermally developed photosensitive material is a recording material that records (exposes) images by the use of a light beam (such as laser beam LB) and then produces colors by thermal development. The photosensitive and heat-sensitive recording material is a recording material that records the latent image by means of a light beam and then produces colors by thermal development.

The data identification portion 53 reads the ID information (patient name, imaged parts, date of imaging, and imaging equipment name) recorded in the heater portion 71 of the acquired image data entered from the mammography imaging unit 3 via the communication IF 51, and identifies the attributes of the acquired image data.

The data-processing portion 55 processes the breast image data obtained from the mammography imaging unit 3 in a given manner (described later) and outputs the processed data to the image exposure portion 63.

The image exposure portion 63 is a unit for exposing the thermally developed recording material 91 by light beam scanning and exposure, and has an auxiliary scan transport portion (transport section 67) such as a transport roller and a scanning-and-exposing portion (laser irradiation section). The scanning-and-exposing portion has a scanning portion including a laser light source and a polygon mirror. The scanning-and-exposing portion scans (principal scan) the laser beam LB while controlling the output of the laser in accordance with image data sent out from the data-processing portion 55. At this time, the thermally developed recording material 91 is conveyed accurately in the auxiliary scan direction by the auxiliary scan transport portion (transport section 67) whose amount of feed is controlled by the transport control portion 61.

A leading edge detection sensor 69 that is a recording medium detection section is positioned in the transport path immediately ahead of the image exposure portion 63 as viewed in the direction of transportation. The sensor 69 detects the leading edge of the thermally developed recording material 91 in the direction of transport, the recording material being conveyed along the transport path, and outputs a recording material detection signal to the control portion 57.

The thermal development portion 65 heats and develops the thermally developed recording material 91 which has been exposed and which has a latent image thereon. For example, the thermal development portion 65 is equipped with a curved plate heater having a curved heating surface. The thermal development portion 65 is also equipped with plural holding rollers which are mounted opposite to the heating surface of the curved plate heater and press the recording medium conveyed over the heating surface against the heating surface and convey the medium. The thermally developed recording material 91 is pressed against the curved plate heater by the holding rollers and elevated in temperature. Thus, the latent image is visualized.

The thermal development recording apparatus (image formation apparatus) 100 of the above-described structure does not need to be connected with the mammography imaging unit 3 in a 1:1 relation. As shown in FIG. 3, a plurality of modalities (e.g., mammography imaging unit 3, CT scanner 5, MRI equipment 7, and so on) may be connected with a network to build the imaging diagnostic system 1. According to this imaging diagnostic system 1, image data obtained by imaging subjects by means of the plural imaging units 3, 5, 7, and so on distributed in various portions can be output from the single thermally developed recording apparatus 100. The recording apparatus 100 can be efficiently utilized.

Figure 4:
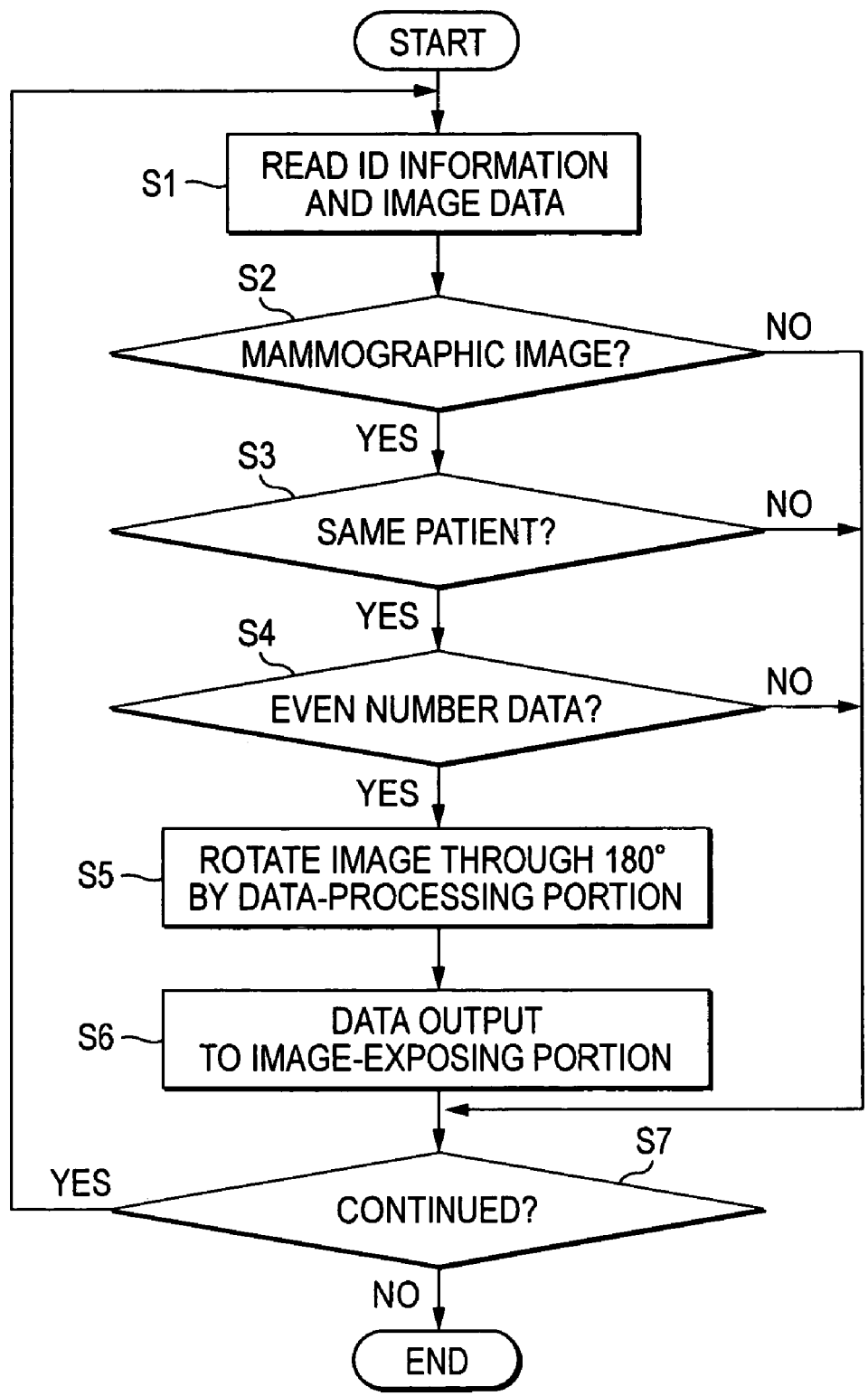
FIG. 4 is a flowchart illustrating a procedure performed by the image formation apparatus to process data.

The operation of the thermally developed recording apparatus 100 constructed as described above is next described by referring to the flowchart of FIG. 4.

As shown in FIG. 1, when operation of the thermally developed recording apparatus 100 is started, the thermally developed recording material 91 accommodated in the thermally developed recording material supply portion 59 is taken out and started to be transported in the direction of the arrow X by the transport section 67.

Meanwhile, if acquired image data is entered to the thermally developed recording apparatus 100 from the mammography imaging unit 3 via the communication line L and communication IF 51, the ID information of the header portion 71 of the data and image data (breast image data) of the image data portion 73 are read in as shown in FIG. 4 (S1). The data identification portion 53 makes a decision from the ID information (imaged part) of the header portion 71 as to whether the entered image data acquired is mammographic image data (breast image data) (S2). If the data is not mammographic image data, the acquired image data is intact (without performing image processing) output to the image exposure portion 63 from the data-processing portion 55 (S6). The laser beam LB is shone on the thermally developed recording material 91 based on the acquired image data to form a latent image on the material.

Scanning of the laser beam LB is started after a lapse of a given time since the leading edge of the conveyed, thermally developed recording material 91 as viewed in the direction of conveyance of the material 91 has been detected by the leading edge detection sensor 69. Therefore, the upper end of the image of each breast is formed in a position spaced from the leading edge of the recording material 91 as viewed in the direction of transportation by a given distance. It is unlikely that a part of the breast image is formed outside the recording material 91. Rather, the whole image fits within the recording material 91.

Because the data identification portion 53 makes a decision as to whether the entered data is mammographic image data, if an imaging unit other than the mammography imaging unit 3 is connected as shown in FIG. 3, and if data is entered from this imaging unit, the data can be appropriately processed (i.e., images can be formed) without problems. That is, with respect to data entered from an imaging unit other than the mammography imaging unit 3, images are formed without performing processing for rotation.

If the decision is that the data is mammographic image data, a decision is made from the ID information (patient name or an index indicative of a patient name) as to whether the data is about the same patient as who provided the previously entered data (S3). If the decision is negative (No), the image data is intact output to the image exposure portion 63 from the data-processing portion 55 (S6). Based on the image data, a latent image is formed.

On the other hand, if the data is about the same patient, a decision is made as to whether the data set is an even-numbered data set from the patient (S4). If the decision is negative (i.e., an odd-numbered data set), the image data is intact output to the image exposure portion 63 from the data-processing portion 55 (S6). Based on the image data, a latent image is formed.

If the decision is that the data set is an even-numbered data set (S4), this even-numbered data set is processed by the data-processing portion 55 such that an image represented by the data set is rotated through 180° (S5). Then, the data is output to the image exposure portion 63 (S6). Based on the image data, a latent image is formed. A decision is then made as to whether the operation for forming an image is continued (S7). If the operation is continued, control returns to the first step, where reading of data is continued. If the operation is not continued, the processing for forming an image is ended.

In the flowchart illustrated in FIG. 4, only even-numbered image data sets about the same patient are processed such that each image represented by such image data sets is rotated through 180°. Instead, only odd-numbered image data sets may be processed to rotate images represented by the data sets. In summary, two successive sets of mammographic image data originating from the same patient can be judged to have arisen from the left and right breasts. Either one image may be rotated through 180°, and images may be formed.

It is also possible to make a decision as to whether each data set is an even- or odd-numbered data set by counting the number of entered sets of acquired image data by means of a counter and making the decision based on the total count of the counter. Alternatively, a flag may be set or reset whenever a set of acquired image data is entered. A decision may be made based on the state of the flag. In this way, any appropriate section is used.

By processing the acquired image data as described above, the following advantages are produced. These are described by referring to FIGS. 5-8.

Figure 5A:
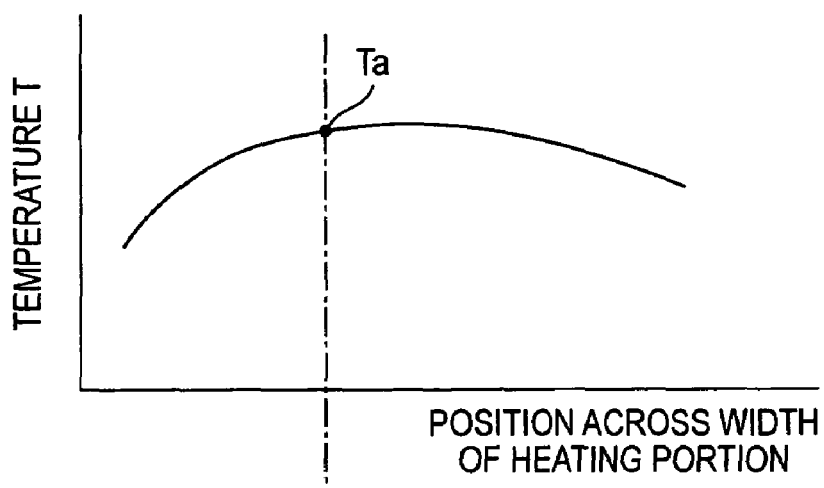
Figure 5B:
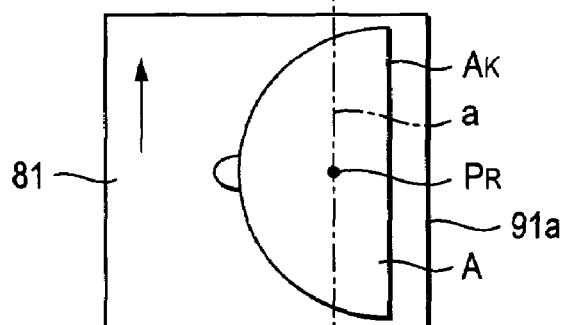
Figure 5C:
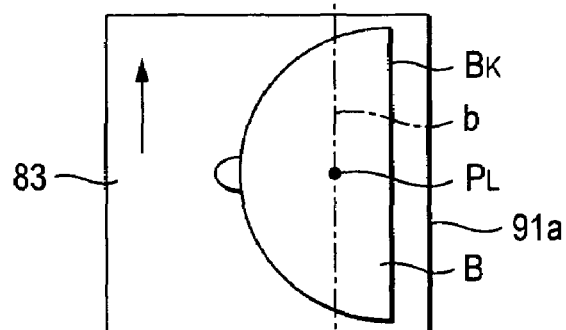

FIGS. 5A-5C illustrate the relation between the temperature distribution across the heating portion and a thermal development position on the recording medium. In FIG. 5A, the temperature of the heating portion is plotted against the widthwise position of the image. FIG. 5B shows a mammographic image including an image of one breast A out of images of the left and right breasts. FIG. 5C shows a mammographic image including an image of the other breast B.

As shown in FIGS. 5A-5C, the mammographic images 81 and 83 have been formed after rotating any one (e.g., image B of the breast) of the images of the left and right breasts through 180° by the data-processing portion 55 (see FIG. 1). The images 81 and 83 contain an image A of the right breast and the image B of the left breast, respectively. The images A and B have chest wall portions $A_K$ and $B_K$, respectively, which extend along a right-end portion 91a that is parallel to the direction of transportation of the thermally developed recording material 91. Furthermore, the images A and B of the breasts are oriented in the same direction (in the leftward direction in the illustrated embodiment). This is to be compared with FIGS. 10A to 10C formed by the related art. Accordingly, the parts of the images A and B of the breasts which correspond to each other (e.g., each point on a line a extending across the breast image A and each point on a line D extending across the breast image B) are brought into contact with the same part of the heating portion of the thermal development portion 65 and developed.

In other words, each point on the lines a and b is brought into contact with the heating portion of given temperature $T_a$ and developed. Accordingly, each point on the line a on the breast image A does not differ in concentration or hue from each point on the line b on the breast image B in spite of the developing temperature. Similar principle applies to other corresponding parts of the breast images A and B. Throughout each of the obtained breast images A and B, their respective corresponding parts are stable in concentration and hue.

Figure 6:
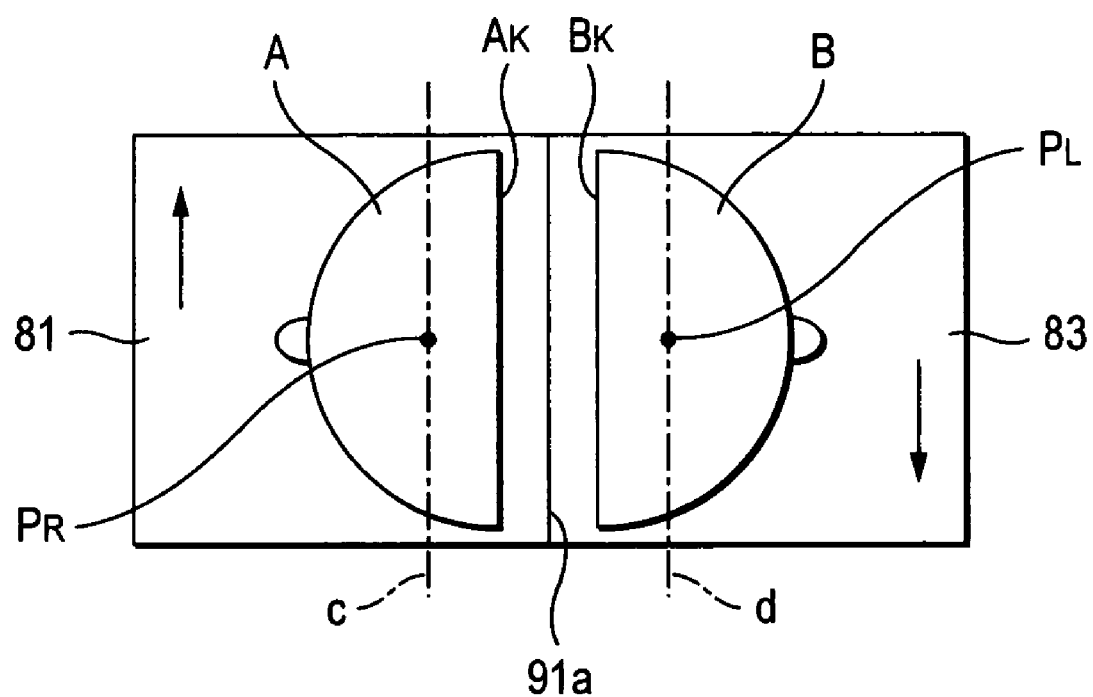
FIG. 6 shows the manner in which the left and right mammographic images of FIGS. 5B and 5C are arranged such that the chest wall portions are placed in a back to back relation and then the images are placed on a showcase.

FIG. 6 shows the state in which the left and right mammographic images obtained in FIGS. 5B and 5C have been placed such that their chest wall portions are in a back to back relation and then the images have been applied on a showcase.

With respect to the mammographic images 81 and 83 obtained in this way, the chest wall portions $A_K$ and $B_K$ of the breast images A and B are placed in a back to back relation as shown in FIG. 6. The images are then applied on a showcase. Since the corresponding parts of the left and right breast images A and B (e.g., point $P_R$ on the breast image A and point $P_L$ an the breast image B) are stable in concentration and hue. Consequently, the doctor who compares the images A and B can easily discern subtle differences in shape and concentration between the left and right breast images A and B.

Figure 7A:
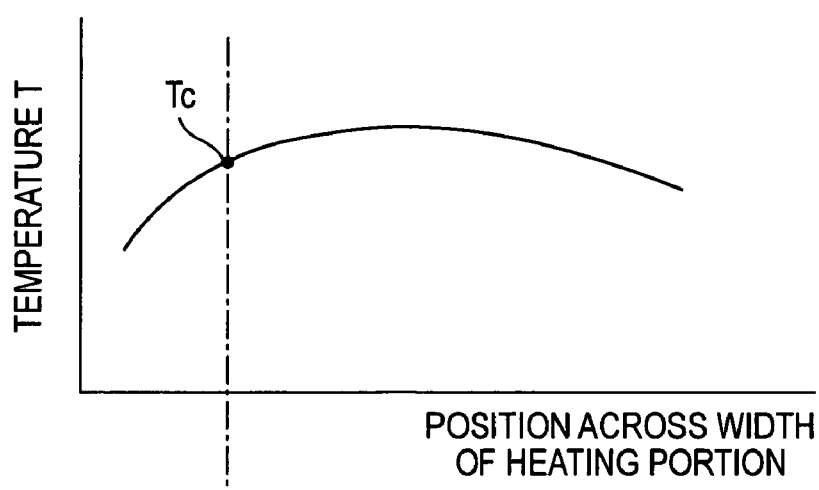
Figure 7B:
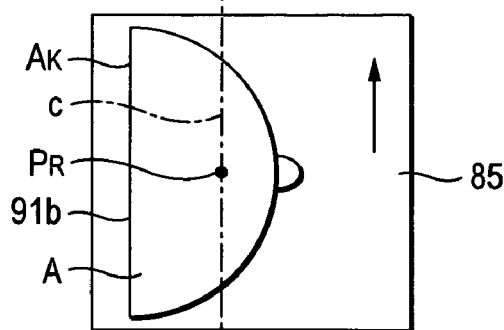
Figure 7C:
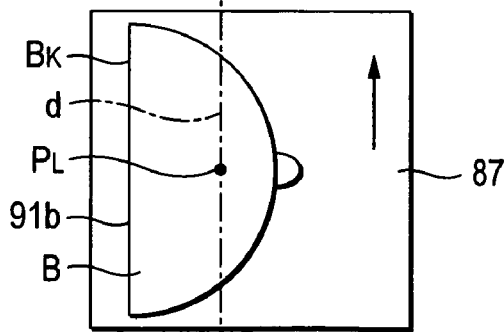

FIGS. 7A-7C illustrate the relation between the temperature distribution across the heating portion and the thermal development position on the recording medium. In FIG. 7A, temperature is plotted against the position of the heating portion across the width of the image. FIG. 7B shows a mammographic image including one breast image A of left and right breast images. FIG. 7C shows a mammographic image including the other breast image B.

Figure 10A:
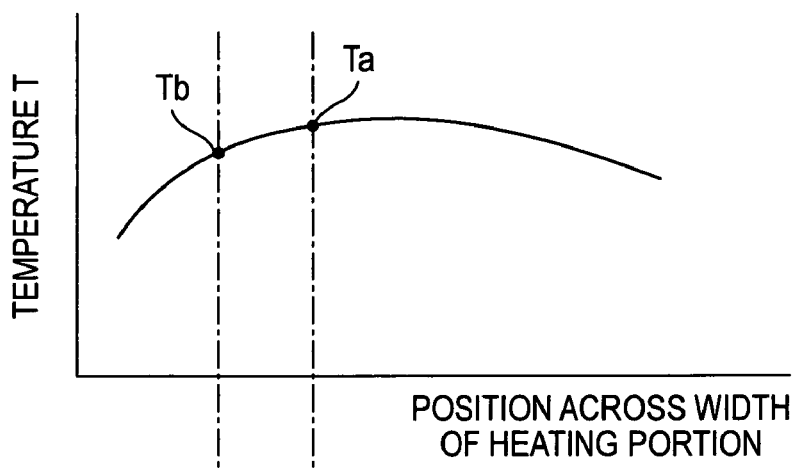
FIGS. 10A to 10C illustrate mammographic images that are thermally developed in the related art by a heating portion having a temperature distribution in its widthwise direction.
Figure 10B:
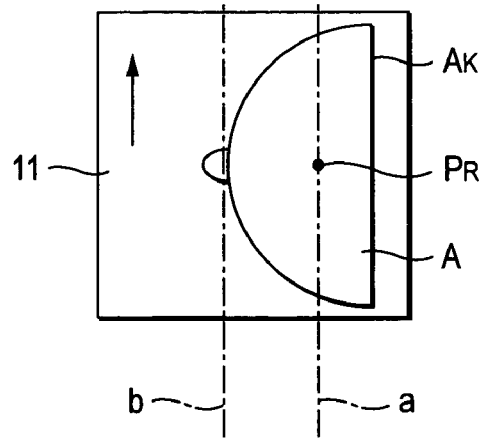
Figure 10C:
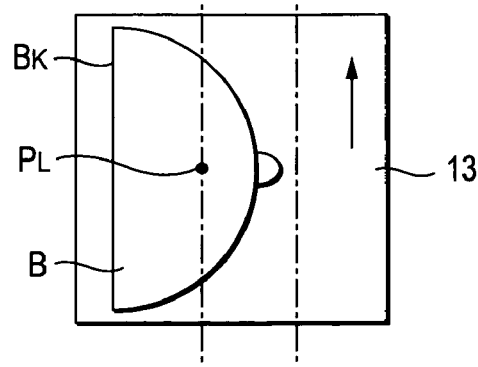

As shown in FIGS. 7A-7C, mammographic images 85 and 87 contain breast images A and B, respectively. The breast image A has been rotated through 180°. The breast images A and B have chest wall portions $A_K$ and $B_K$, respectively, which extend along the left-end portions 91b that are parallel to the direction of transportation of the thermally developed recording material 91. The breast images A and B are oriented in the same direction (in the rightward direction in the illustrated embodiment). This is to be compared with FIGS. 10A to 10C illustrating the related art. Parts of the breast images A and B which correspond to each other (e.g., each point on a line c on the breast image A and each point on a line d on the breast image B) are brought into contact with the same part of the heating portion of the thermal development portion 65 and developed.

Since each point on the lines c and d is brought into contact with the heating portion of temperature $T_c$ and developed, each point on the line c on the breast image A and each point on the line d on the breast image B are prevented from becoming nonuniform in concentration and hue in spite of developing temperature. Similar principle applies to other corresponding parts of the breast images A and B. The corresponding parts of the breast images A and B are stable in concentration and hue over the whole of each of the images A and B.

Figure 8:
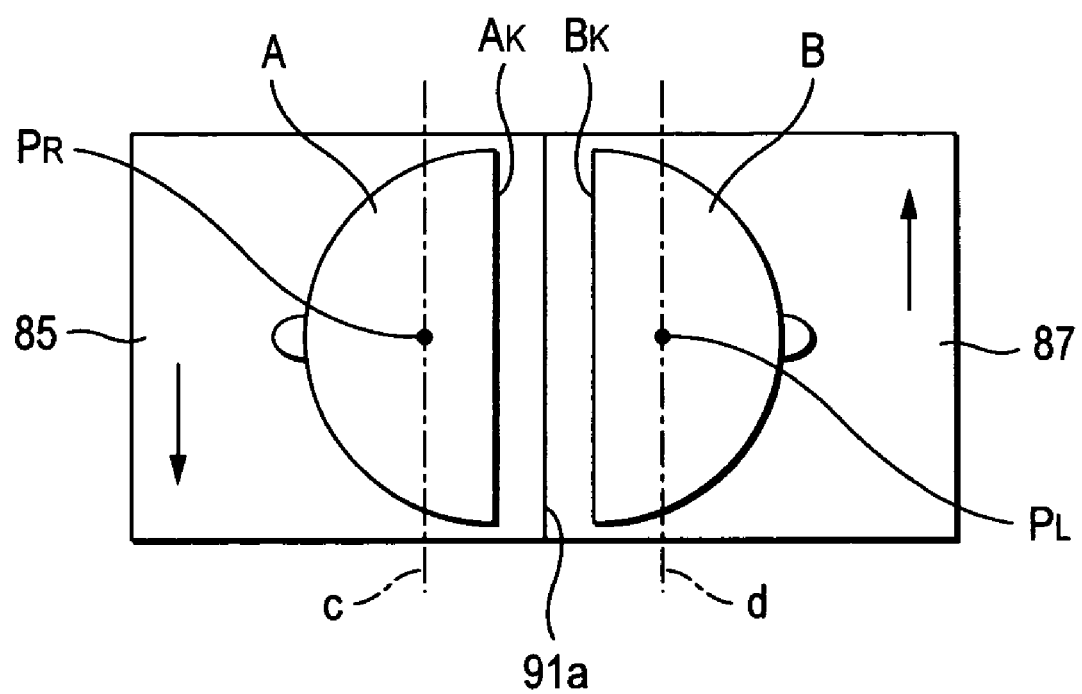
FIG. 8 shows the state in which the left and right mammographic images of FIGS. 7B and 7C are arranged such that the chest wall portions are placed in a back to back relation and then the images are placed on a showcase.

FIG. 8 shows the state in which the left and right mammographic images obtained in FIGS. 7B and 7C have been placed such that their chest wall portions are in a back to back relation and then the images have been applied on a showcase.

With respect to the mammographic images 85 and 87 obtained in this way, the chest wall portions $A_K$ and $B_K$ of the breast walls A and B are placed in a back to back relation as shown in FIG. 8. The images are then applied on a showcase. Since the corresponding parts of the left and right breast images A and B (e.g., point $P_R$ in the breast image A and point $P_L$ in the breast image B) are stable in concentration and hue. Consequently, the doctor can easily discern subtle differences in shape and concentration between the left and right breast images A and B.

Figure 9:
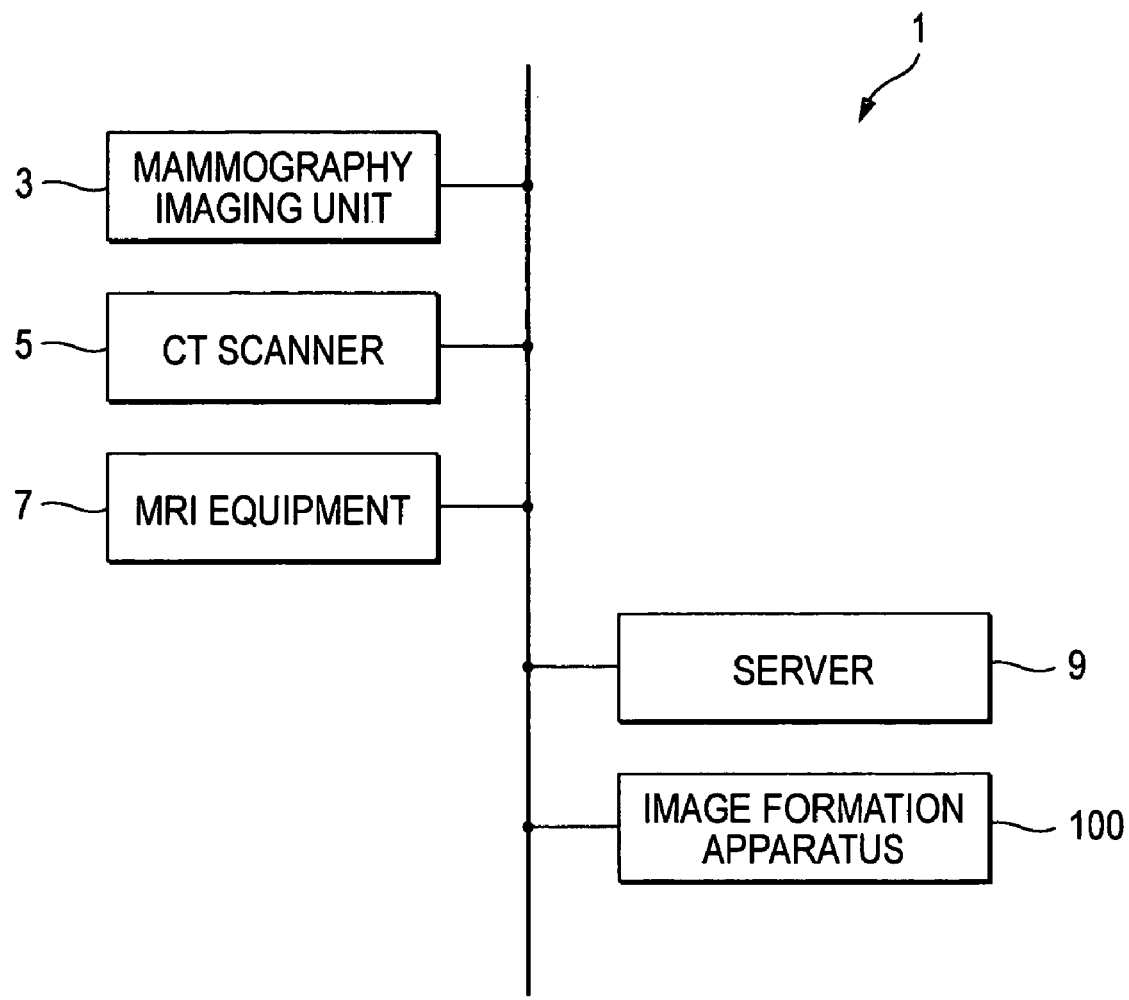
FIG. 9 is a diagram of a large-scale imaging diagnostic system including a server.

It is to be understood that the image formation apparatus associated with the present invention is not limited to the above-described embodiments but rather modifications and improvements can be made appropriately. In the present embodiment, rotation of images indicated by image data is performed by the data processing portion disposed in the data formation apparatus. The rotation may be performed anywhere as long as prior to exposure of the recording medium performed by the image exposure portion. For example, as shown in FIG. 9, in a case where a large-scale imaging diagnostic system 1 including a server 9 as its component is built, the data identification portion 53 and data-processing portion 55 disposed within the image formation apparatus 100 in the above embodiments may be disposed within the server 9. Image data may also be output after performing the processing for rotating images by the server 9. This modified embodiment also yields the same advantages as the above-described embodiments.

According to the image formation apparatus of the present invention, corresponding parts of left and right breast images originating from the same patient are developed under the same temperature conditions. The corresponding parts of the breast images are prevented from becoming nonuniform in concentration and hue due to a temperature distribution across the heating portion. Good-quality mammographic images can be formed. In consequence, it is easy to compare and diagnose the left and right breast images.

The entire disclosure of each and every foreign patent application from which the benefit of foreign priority has been claimed in the present application is incorporated herein by reference, as if fully set forth.

What is claimed is:

1. An image formation apparatus comprising:
   an image exposure portion that forms a latent image by optically exposing a recording medium based on entered image data;
   a thermal development portion that visualizes the latent image by heating the recording medium exposed by the image exposure portion;
   a data identification portion that reads ID information about image data obtained by mammography; and
   a data-processing portion that: when the data identification portion has determined that a set of breast image data about the same patient have been entered successively, rotates through 180° (i) images represented by even-numbered input ones of the set of breast image data or (ii) images represented by odd-numbered input ones of the set of breast image data; and then outputs the image data to the image exposure portion.

2. An image formation apparatus as set forth in claim 1, wherein the data-processing portion processes the set of breast image data about the same patient, the set of breast image data comprising successively-input image data about left and right breast images, so as to rotate any one of the successively-input image data such that each of chest wall portions under the left and right breast images to be formed on the recording medium based on the breast image data extends along an end portion of the recording medium that are parallel to a direction of transportation of the recording medium and that the left and right breast images are oriented in the same direction.

3. An image formation apparatus as set forth in claim 1, wherein when the data-processing portion rotates through 180° images represented by even-numbered input ones of the set breast image data, the odd-numbered input ones of the set breast image data are not rotated, and when the data-processing portion rotates through 180° images represented by odd-numbered input ones of the set breast image data, the even-numbered input ones of the set breast image data are not rotated.

4. An image formation apparatus as set forth in claim 1, wherein the heating the recording medium produces colors to visualize the latent image formed thereon.

5. An image formation apparatus comprising:
   an image exposure portion that forms a latent image by optically exposing a recording medium based on entered image data;
   a thermal development portion that visualizes the latent image by heating the recording medium exposed by the image exposure portion;
   a data identification portion that reads ID information about image data obtained by mammography; and
   a data-processing means for receiving the ID information and for images associated with identification of a patient, said data processing means further includes means for determining whether a set of breast image data about the same patient have been entered successively, and said data processing means further includes means for rotating through 180°one of (i) images represented by even-numbered input ones of the set of breast image data and (ii) images represented by odd-numbered input ones of the set of breast image data; and then outputs the image data to the image exposure portion.

6. The image formation apparatus of claim 5, wherein the thermal development portion includes a contact heater.

* * * * *